Aug. 9, 1938.  P. E. CATE  2,126,532
METHOD AND APPARATUS FOR CHARGING THERMOSTATIC DEVICES
Filed Aug. 27, 1935   2 Sheets-Sheet 2
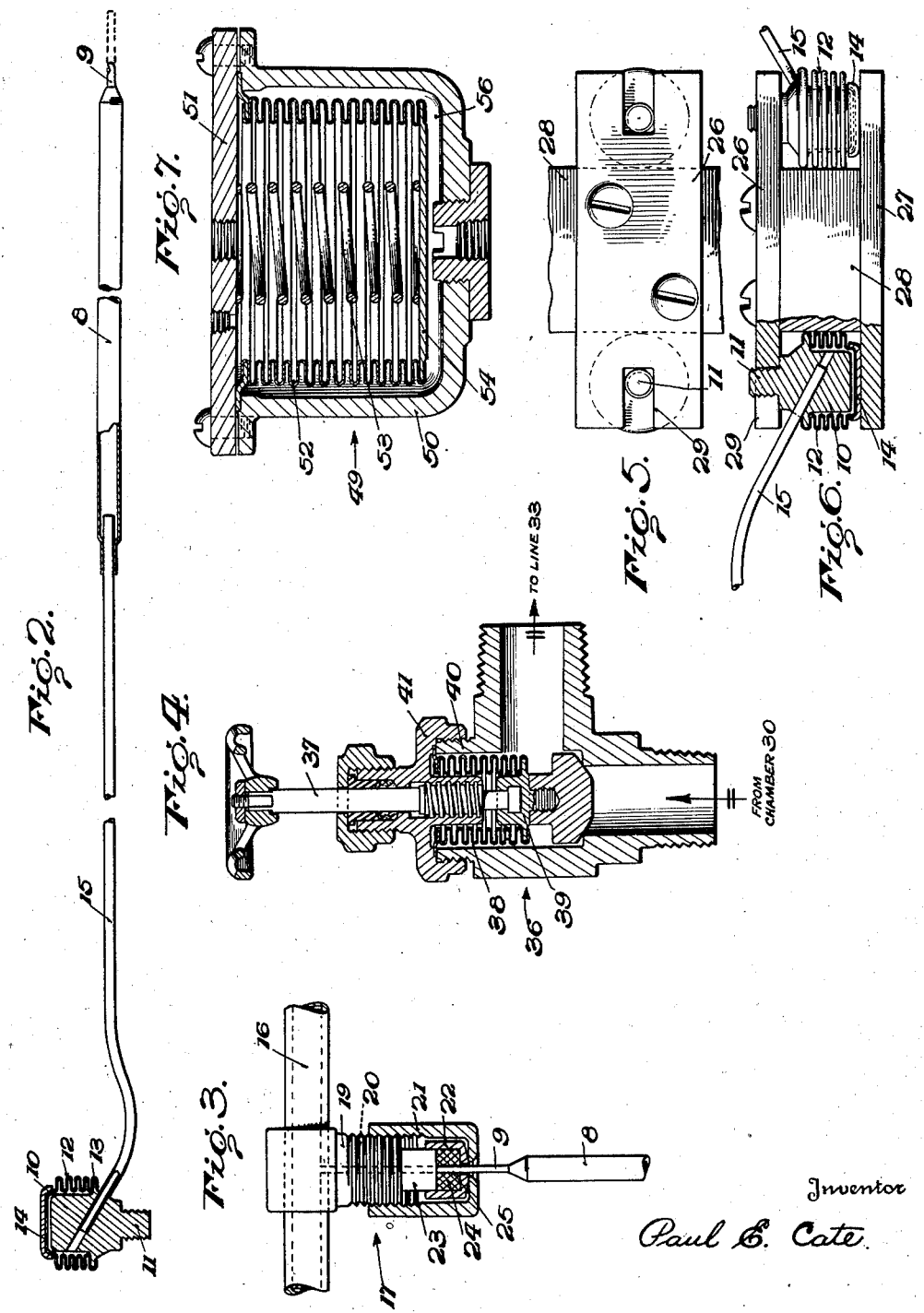
Inventor
Paul E. Cate
By Cameron, Kerkam & Sutton
Attorneys Patented Aug. 9, 1938

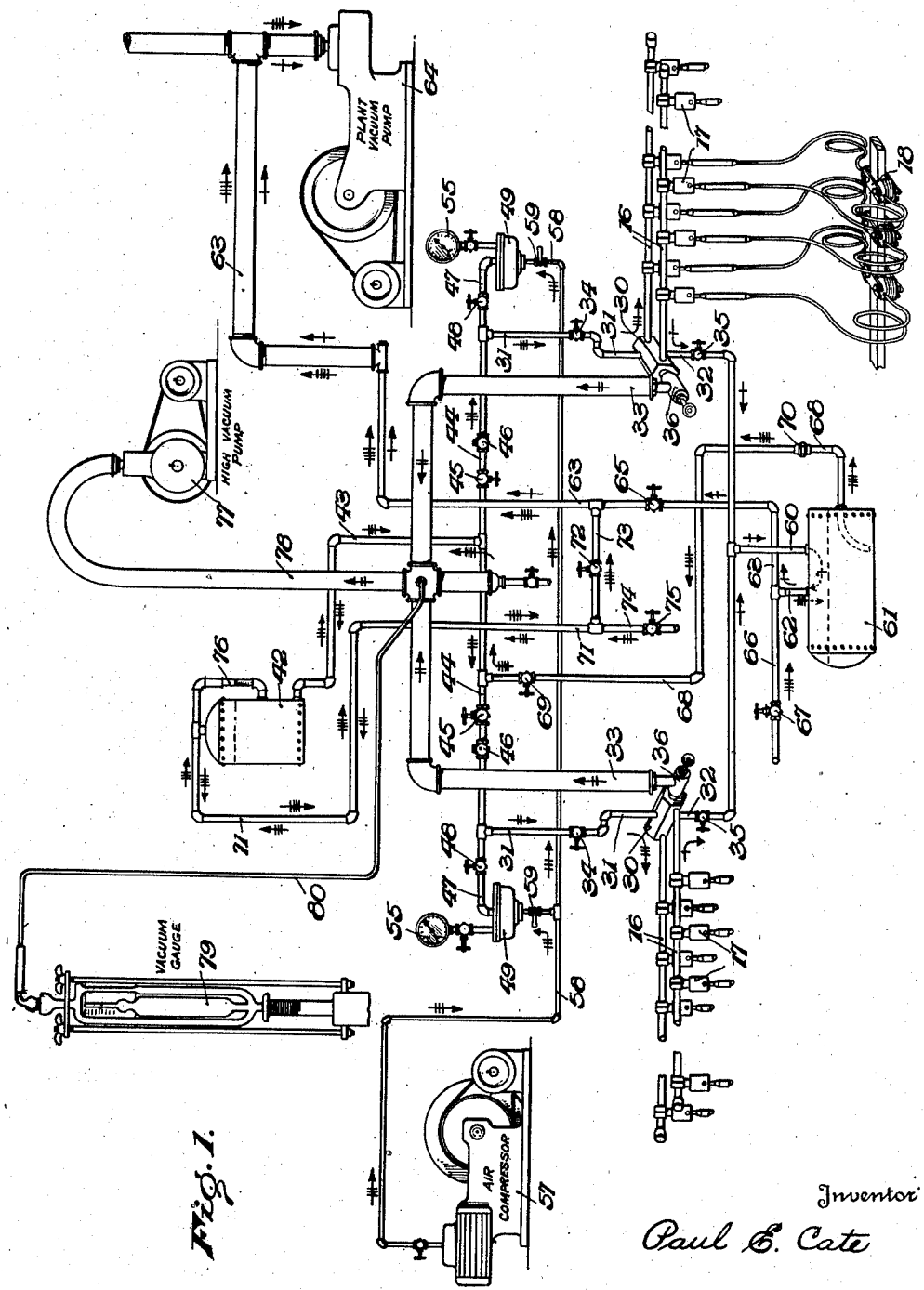

2,126,532

UNITED STATES PATENT OFFICE 2,126,532

METHOD AND APPARATUS FOR CHARGING THERMOSTATIC DEVICES

Paul E. Cate, Knoxville, Tenn., assignor to The Fulton Sylphon Company, Knoxville, Tenn., a corporation of Delaware Application August 27, 1935, Serial No. 38,130

17 Claims. (Cl. 226—73)

This invention relates to the manufacture of thermostatic devices, and more particularly to a method and apparatus for charging thermostatic assemblies of the type containing a thermo-responsive liquid.

One form of thermostatic device to the charging of which the present invention is particularly well adapted (shown in Fig. 2 of the accompanying drawings) consists of a thermostatic bulb intended to be subjected to the temperature by which the device is controlled, a combined bellows head and stop to which the bulb is connected by a capillary tube, and a bellows member connected at one end to the head and having an opposite end wall adapted to be movable relatively to the combined head and stop in response to the temperature variations to which the thermostatic bulb is exposed. The movements of the bellows end wall are controlled by the expansion and contraction of a suitable thermo-responsive liquid with which the assembly of bulb, tube and bellows is charged.

With the methods and apparatus heretofore available many difficulties have been encountered in charging thermostats of this type on a production basis. For example, although it is vitally important to the efficient operation of such devices that the assemblies be free from air, moisture and other foreign substances after charging, much trouble has been experienced in carrying out the charging operation under such conditions as to insure this result. It is of perhaps even greater importance in the case of a liquid filled thermostat that this particular form of assembly be completely filled with the charging liquid; however, the attainment of this condition has also been a difficult task, particularly because of the fact that the capillary connecting tube has only a very small bore, the diameter thereof being on the order of .025". It has also been necessary to exercise great care in handling the charging liquid in order to avoid the inclusion of any foreign matter which might stop up this small tubing.

It is therefore one of the objects of the present invention to provide a novel method and apparatus for charging thermostatic assemblies which will overcome the difficulties hitherto experienced in this work and will be capable of accurately and efficiently charging such devices on a production basis.

Another object is to provide a new and improved procedure and mechanism for efficiently evacuating a number of thermostatic assemblies and then charging them with accurately determined quantities of a suitable liquid.

A further object is to provide a method and apparatus whereby the evacuation and charging of thermostatic devices of the type referred to may be carried out with a minimum of manual operations and a maximum of protection against undesired conditions in the finished product.

Still another object is to provide a novel procedure and arrangement of mechanism whereby thermostats of this character may be quickly and efficiently charged under accurately controlled conditions and without loss or wastage of the charging liquid.

A still further object is to provide an apparatus for the purpose described wherein all of the operations performed during the charging cycle may be controlled by the mere opening and closing of various valves in an established sequence.

These and other objects, including the provision of various mechanical elements of novel construction for performing certain of the individual functions required by the method and general apparatus arrangement of the invention, will appear more fully from a consideration of the detailed description of the embodiment of the invention which follows. Although only one mechanical exemplification of the method and apparatus of the invention has been described and illustrated in the accompanying drawings, it is to be expressly understood that these drawings are for the purpose of illustration only and are not to be construed as defining the scope of the invention, reference being had for this purpose to the appended claims.

Referring now to the drawings, wherein like reference characters indicate like parts throughout the several views:

Fig. 1 is a diagrammatic showing of one arrangement of thermostat evacuating and charging equipment embodying both the method and apparatus features of the present invention;

Fig. 2 is a side view, with certain parts shown in section, of one form of thermostatic assembly for the charging of which the method and apparatus of the present invention is particularly well adapted;

Fig. 3 is an elevation, with certain parts shown in section, of one of the fixtures of the arrangement shown in Fig. 1 by which the thermostatic assemblies are connected to the evacuating and charging equipment;

Fig. 4 is a sectional view of one of the packless valves of Fig. 1 which control the application of the high vacuum to the thermostatic assemblies;

Figs. 5 and 6 are plan and elevation views, respectively, the latter being partially in section, of the clamping device of Fig. 1 by which the bellows are maintained at a fixed length during the charging operation so as to insure a uniform amount of liquid in the assemblies; and Fig. 7 is a sectional view of one of the pressure pots of Fig. 1 by which the charging liquid is forced into the thermostatic assemblies under pressure so as to insure complete filling thereof.

Referring first to Fig. 2, the thermostatic assembly therein shown, for the charging of which the apparatus of Figs. 1 and 3–7 is especially well adapted, consists of a thermostatic bulb 8 having at one end a tip 9 of reduced diameter, a combined bellows head and stop 10 having a threaded boss 11 extending from one end, a bellows 12 secured to head 10 in any suitable manner as at 13 and having a movable end wall 14, and a capillary tube 15 connecting the interior of bulb 8 with combined head and stop 10 and communicating with the space between said head and stop and the bellows 12. Before charging, the tip 9 of bulb 8 is cylindrical, as indicated in broken lines in Fig. 2, and is open at its outer end, being crimped and closed to the form shown in solid lines in Fig. 2 at the end of the charging operation by any suitable form of mechanism.

In order to accurately and efficiently charge thermostatic assemblies of this character, a novel arrangement of mechanism, diagrammatically illustrated in Fig. 1, has been provided for first evacuating the assemblies so as to insure the removal of all air, moisture and other foreign matter therefrom, and then filling them with a suitable thermoresponsive liquid which is forced into the assemblies under pressure to insure proper filling thereof, each assembly being so supported during this operation that the volume thereof, and consequently the volume of liquid which can be placed therein, is definitely and uniformly limited. The system is also so arranged that, after the charging operation is completed, the thermostatic assemblies may be disconnected from the charging manifolds without the loss of any of the charging liquid, means being provided for withdrawing to a suitable reservoir that liquid which remains in the manifolds after the assemblies have been completely filled and for periodically returning the liquid thus withdrawn to the main source of supply.

In the equipment diagrammatically illustrated in Fig. 1, the tips 9 of any desired number of thermostatic assemblies may be connected to one or more charging manifolds 16 by means of sealing connectors indicated generally at 17, while the bellows ends of the assemblies are supported in suitable clamps 18 which hold the bellows at the proper degree of extension during the charging operation so as to insure the charging of a definite and uniform amount of liquid in each of the assemblies.

As shown in Fig. 3, each of the sealing connectors 17 comprises an externally threaded body portion 19 mounted on manifold 16 and communicating with the interior of the latter through a passageway 20 of substantially the same diameter as the tip 9 of the thermostatic assembly. Threaded onto body portion 19 is a hollow clamping nut 21 within which is supported a cup-shaped guide member 22 the upper end of which is in telescoping engagement with a downwardly depending boss 23 of reduced diameter formed integrally with body portion 19. Housed within guide member 22 is a sealing gland 24 made of any suitable relatively soft substance, such as rubber, and having a passage 25 therethrough coaxial with passage 20 and of such size as to receive with a frictional fit the tip 9 of one of the thermostatic assemblies. Clamping nut 21 and guide member 22 are also provided with suitable openings to permit the insertion of tip 9. With this construction, the bore of tip 9 may be brought into direct communication with passage 20 and through said passage with the interior of manifold 16, the connection being rendered fluid-tight by screwing up on clamping nut 21 and thereby compressing gland 24 tightly around tip 9 and against the lower end of boss 23.

Each of bellows holding clamps 18, the details of which are shown in Figs. 5 and 6, comprises a pair of parallel plates 26 and 27 which are secured to and spaced a predetermined distance apart by a member 28. If desired, a single elongated member 28 may serve to support a plurality of clamps 18, as indicated in Fig. 1. Both plates 26 and 27 extend laterally beyond the side edges of member 28, the portions of said plates on each side of said member constituting a holding or clamping device for the bellows end of one thermostatic assembly. As shown, the bottom plate 27 is solid and serves as a support for the movable end wall 14 of the bellows while the top plate 26 is slotted at 29 so as to receive the threaded boss 11, the shoulder between said boss and bellows head 10 abutting against the under surface of said plate. It is obvious that with this construction the expansion of each of the bellows is limited to a predetermined amount with the result that the volume of the thermostatic assembly is correspondingly limited during the charging operation.

Returning now to the general arrangement of equipment illustrated in Fig. 1, each of manifolds 16 is connected at its inner end to a supply chamber 30 of any suitable construction to which are connected a charging liquid supply line 31, and exhaust line 32 which serves both to create an initial vacuum in the manifolds 16 and the thermostatic assemblies and also to remove the charging liquid remaining in the manifolds after the assemblies are completely filled, and a second exhaust line 33 through which a high vacuum is created in the manifolds and thermostatic assemblies. Lines 31 and 32 are controlled by valves 34 and 35, respectively, of any suitable construction, while the connection between line 33 and chamber 30 is controlled by a special form of packless valve 36 the details of which are shown in Fig. 4. As there shown, leakage of air around valve spindle 37 into the valve chamber, in which a relatively high vacuum must be maintained during final exhaustion of the thermostatic assemblies, is effectually prevented by the use of a bellows sealing member 38 one end of which is secured to the movable valve member 39 while the other end is tightly clamped between valve body 40 and bonnet 41.

The charging liquid, which may be of any suitable character, is supplied to lines 31 from a main supply tank 42 through suitable pipe lines 43 and 44, each of the latter having interposed therein a stop valve 45 of any desired construction and a check valve 46. Main supply tank 42 is preferably positioned at a higher level than chambers 30 and manifolds 16 in order that the charging liquid may tend to flow from the tank to the assemblies by gravity.

Means may also be provided for subjecting the charging liquid in supply lines 31, chambers 30 and manifolds 16 to sufficient pressure to insure complete filling of the thermostatic assembles in spite of the relatively small bores of capillary tubes 15. In the embodiment illustrated, each supply line 31 is connected through a pipe 47, controlled by a valve 48, to a pressure pot 49. As shown in Fig. 7, pressure pot 49 comprises a casing or housing 50, a top or cover plate 51, a bellows member 52 housed within casing 50 with its upper open end tightly clamped between said casing and plate 51, and a suitable spring 53 interposed between the inner surface of plate 51 and the movable end wall 54 of the bellows 52, said spring tending to expand the bellows within casing 50. The interior of bellows member 52 communicates with pipe 47 and also with a suitable pressure gauge 55 (Fig. 1). The space between the outer surface of bellows 52 and the inner surface of casing 50 constitutes a pressure chamber 56 which is connected to a source of pressure such as an air compressor 57 of any suitable type through a pipe line 58, communication between the air compressor and said space being controlled by a cock 59 which in its normally closed position vents the pressure chamber 56 to the atmosphere.

Returning now to the exhaust lines 32 and 33 leading from each of chambers 30, it will be seen that lines 32 are connected through a pipe 60 with the top of a tank or container 61 which serves both as a part of the vacuum creating system and as a temporary or auxiliary reservoir for the charging liquid which remains in and is withdrawn from the manifolds 16 and chambers 30 after each charging operation. The top of tank 61 also communicates with another pipe 62 which is in turn connected to an exhaust line 63 leading to the plant or low vacuum pump 64. The flow through exhaust line 63 is controlled by a suitable valve 65. Pipe 62 and line 63 are also connected with a pipe 66 which may be placed in communication with the atmosphere by the opening of a valve 67.

Suitable connections are also provided between main supply tank 42 and auxiliary reservoir 61 so that the charging liquid which is accumulated in the latter may be periodically returned to the former. As shown, a liquid return line 68 extends from a point within and near the bottom of tank 61 upwardly to a connection with one of lines 44 at a point intermediate valve 45 and the connection between lines 44 and 43. The flow through pipe 68 is controlled by a suitable valve 69. Pipe 68 is also provided with a suitable coupling 70 which can be broken and have an adapter connected thereto so as to draw liquid from any suitable container upwardly into main supply tank 42 and thereby replenish the supply thereof.

The flow of liquid upwardly through pipe 68 into main supply tank 42 may be effected by creating a partial vacuum in tank 42 and permitting atmospheric pressure to be exerted on the surface of the liquid in tank 61 through pipes 66 and 62. For this purpose, tank 42 is provided with a line 71 which connects the top of said tank with exhaust line 63 at a point intermediate valve 65 and vacuum pump 64. Communication between lines 71 and 63 is controlled by a suitable valve 72 interposed in a pipe 73 which cross connects these two lines. Line 71 may also be connected with the atmosphere through a section of pipe 74 under the control of a suitable valve 75 so that during the charging operation the liquid in tank 42 may be subjected to atmospheric pressure. If desired, tank 42 may be provided with a suitable gauge 76 for indicating the level of the liquid therewithin.

Each high vacuum exhaust line 33 is connected to a high vacuum pump 77 through a pipe 78, the junction of lines 33 and pipe 78 being connected to a suitable vacuum gauge 79 through tubing 80.

In charging thermostatic assemblies by the method and apparatus disclosed, the assemblies are first connected to the system by placing tips 10 9 of the thermostatic bulbs 8 in communication with passages 20 of the sealing connectors 17, as indicated in Fig. 3, while the bellows ends of the assemblies are mounted in clamps 18 in the manner illustrated in Figs. 5 and 6. It is assumed that at this time all of the valves of the entire system are closed with the exception of those connecting pressure gauges 55 to their associated pressure pots 49. Valves 35 and 65 in exhaust lines 32 and 63, respectively, are then opened so as to contact the manifolds 16 and chambers 30 to the plant or low vacuum pump 64 through lines 32, pipe 60, tank 61, pipe 62 and line 63, the air flow being indicated by the arrows in Fig. 1 bearing the single cross marks. After the so-called "plant" or low vacuum has been created in the thermostatic assemblies so as to remove therefrom the major portion of the air and moisture originally contained therein, valves 35 are closed and the packless high vacuum valves 36 are opened, thereby connecting manifolds 16 and chambers 30 to high vacuum exhaust lines 33 and permitting the assemblies to be further evacuated by high vacuum pump 77 through lines 33 and pipe 78, as indicated by the double crossed arrows. This second stage of evacuation is continued until a pressure of 50 microns or less is indicated on the vacuum gauge 79, at which time valves 36 are closed.

The charging liquid valves 34 and 45 are then opened so as to permit the charging liquid to flow from main supply tank 42 downwardly through lines 43, 44 and 31 into chambers 30, manifolds 16 and the thermostatic assemblies under the influence of atmospheric pressure which is admitted to the top of tank 42 by opening valve 75. Valves 48 are also opened at this time to allow some of the charging liquid to flow into and fill the interiors of bellows members 52 of pressure pots 49 and extend the latter to their full length, it being understood that at this time cocks 59 are closed so as to vent pressure chambers 56 to the atmosphere. After valves 34 have remained open a sufficient length of time to permit the charging liquid to fill the bellows members 52, chambers 30, manifolds 16 and as much of the thermostatic assemblies as can be filled under atmospheric pressure and the force of gravity, cocks 59 are opened so as to admit air under pressure from compressor 57 to the pressure chambers 56 of pressure pots 49, the air pressure moving the bellows members 52 upwardly and thereby forcing some of the charging liquid contained in said bellows out of pots 49 and placing all of the liquid in pipes 47, lines 31, chambers 30, manifolds 16 and the thermostatic elements under a pressure equal to that admitted to chambers 56. This pressure, which will be indicated on gauges 55, will exist in lines 44 only as far as check valves 46. The flow of air and liquid during this filling operation is indicated by the arrows bearing triple cross marks.

It is to be noted that with this arrangement of apparatus, it is possible to put a part of the charging system under considerable air pressure without danger of absorption by the charging liquid of any of the pressure air because of direct contact therewith, one of the conditions which it is the object of the present invention to avoid.

After the pressure has remained on the charging liquid for a sufficient period of time to insure proper filling of all of the thermostatic elements, the portions of tips 9 extending below clamping nuts 21 of sealing connectors 17 are pinched together with a suitable crimping tool (not shown) so as to prevent further ingress or egress of liquid to or from the thermostatic assemblies. The air pressure cocks 59 are then closed so as to vent pressure chambers 56 to the atmosphere and thereby reduce the pressure on the liquid between check valves 44 and connectors 17. As soon as the pressure is thus relieved, bellows members 52 are expanded under the combined influence of the hydrostatic head of liquid and springs 53, the increased volume within said bellows members being refilled with charging liquid drawn through check valves 46. Charging liquid valves 34 are then closed and valves 35 in exhaust lines 32 opened so as to apply the suction of plant vacuum pump 64 to lines 32, chambers 30 and manifolds 16. Then, when the ends of tips 9 of the thermostatic assemblies are removed from connectors 17, the difference in pressure created by the suction applied through lines 32 and the atmospheric pressure exerted at the open ends of passages 20 of connectors 17 will force whatever charging liquid remains in manifolds 16, chambers 30 and the portions of lines 31 below valves 34 through lines 32 and pipe 60 into tank 61. The direction of flow of the liquid and air during this part of the procedure is indicated by the arrows bearing the single cross marks. As soon as all of the liquid remaining in the system below valves 34 has been drawn into tank 61, valves 35 are closed and the system is ready to repeat the charging cycle.

After the thermostatic assemblies have been removed from the charging equipment, the portions of tips 9 extending beyond the pinched together points are cut off and the ends of the tips are welded to the permanently closed condition indicated in Fig. 2.

In the arrangement of apparatus illustrated in Fig. 1, two sets of manifolds and associated equipment are shown. While both sets may be operated simultaneously so that all of the thermostatic assemblies connected thereto will be exhausted and charged at the same time, this arrangement is additionally advantageous in that it permits practically continuous operation by so manipulating the valves that the assemblies connected to one set of manifolds are being evacuated at the time that those connected to the other set are being charged.

After a period of repeated charging operations, it will be desirable to transfer back to main supply tank 42 the charging liquid which has accumulated in tank 61, thereby permitting this liquid, which would otherwise be wasted, to be used again. In order to effect this transfer of liquid from tank 61 to tank 42, exhausting and charging operations must be discontinued and valves 45 and 75 closed so as to prevent further flow of liquid out of tank 42 through line 43. Valve 65 in low vacuum line 63 is then closed and valve 67 opened so as to admit atmospheric pressure to tank 61 through pipes 66 and 62. Valve 72 in cross connecting pipe 73 is then opened to permit the suction of plant or low vacuum pump 64 to be applied to the upper portion of main supply tank 42 through line 71, thereby creating a partial vacuum on top of the liquid in said tank. By then opening valve 69 in line 68, the difference between the atmospheric pressure exerted on the top of the liquid in tank 61 and the partial vacuum existing in the top of tank 42 causes the liquid to flow from tank 61 upwardly through line 68, a portion of line 44, and line 43 into tank 42. The directions of flow of air and liquid during this operation are indicated by the arrows bearing quadruple cross marks.

Whenever it becomes necessary to replenish the supply of liquid in the system, coupling 70 in line 68 may be broken and the upper portion of said line provided with an adapter whereby liquid may be drawn up from any suitable container into tank 42 by creating a partial vacuum in said tank in the manner just described. After a suitable amount of liquid has been thus supplied to tank 42, it may be conditioned so as to free it of air by closing valve 69 in line 68 but continuing the evacuation of the upper portion of tank 42 through pipe 71.

There are thus provided by the present invention both a novel method and new and improved apparatus for charging thermostatic assemblies of the liquid expansion type which make possible performance of the charging cycle in a relatively simple and efficient manner and which are also particularly well adapted to operation on a production basis. The procedure of the method involved in the invention comprises a series of related steps which lend themselves to practically continuous production by the simple expedient of dividing the assemblies into two or more groups and applying the cycle of the method to these groups in different phases. The apparatus provided is of simple character, embodies a minimum of moving parts, and, with the exception of the initial and final connection and disconnection of the assemblies, requires only the opening and closing of various valves in a predetermined sequence in order to carry out the entire cycle. By use of the method and apparatus of the present invention it is possible to fill thermostatic assemblies with definite and predetermined quantities of liquid and to insure that no air, moisture or other foreign matter remains in the assemblies after the charging operation is completed; it will also be noted that the charging liquid is at all times protected against contamination. Furthermore, the procedure and equipment are so arranged that there is no loss or wastage of the charging liquid, the quantities thereof which remain in the system after each charging cycle being ultimately returned to the source of supply and used over again. The apparatus of the invention also includes novel means for supporting the thermostatic assemblies and connecting them to the charging system, and for forcing the liquid into the assemblies under pressure so as to insure proper filling thereof.

While one constructional form of the invention, illustrating both the method and apparatus features thereof, has been described with some particularity, it will be obvious that the invention is not limited to the apparatus shown in the drawings but is capable of a variety of mechanical embodiments. For example, while two sets of charging manifolds and associated equipment have been shown and described, it is apparent that any suitable number of sets may be utilized; if desired, only one set need be employed, although in this event the rate of production would not be as great. Likewise, it is apparent that many of the mechanical elements of the system may be replaced by other equivalent constructions without in any way affecting the inventive concept. It should also be obvious that the method and apparatus of the invention may be readily adapted for charging thermostatic elements of constructions other than that specifically shown in the drawings, and that certain of the procedural steps and structural elements may be omitted, or may be used in other combinations for the attainment of their intended purposes. For instance, the invention may be employed in the charging of thermostats which are only partially filled with liquid, in which case the pressure filling mechanism might be unnecessary.

Various other changes, some of which will now readily suggest themselves to those skilled in the art, may be made in the specific nature of the procedural steps and in the form, details of construction and arrangement of the parts of the apparatus without departing from the spirit of the invention. Reference is therefore to be had to the appended claims for a definition of the limits of the invention.

What is claimed is:

1. A method of charging a thermostatic assembly comprising the steps of subjecting said assembly to a relatively high vacuum to evacuate the same, flowing a quantity of thermo-responsive liquid into said evacuated assembly under atmospheric pressure, and then as a separate step after said assembly has been filled at atmospheric pressure applying air pressure to produce an increased pressure on said liquid while preventing contact of the air with said liquid to force an additional quantity of liquid into said assembly under a pressure greater than atmospheric.

2. A method of charging a thermostatic assembly comprising the steps of subjecting said assembly to a plurality of successively higher values of vacuum to evacuate the same, flowing a quantity of thermo-responsive liquid into said evacuated assembly under atmospheric pressure, and then as a separate step after said assembly has been filled at atmospheric pressure applying air pressure to produce an increased pressure on said liquid while preventing contact of the air with said liquid to force an additional quantity of liquid into said assembly under a pressure greater than atmospheric.

3. A method of charging a thermostatic assembly comprising the steps of evacuating said assembly, utilizing the vacuum thus created for causing a supply of thermo-responsive liquid subjected to atmospheric pressure to flow into said assembly, and then as a separate step after said assembly has been filled at atmospheric pressure applying air pressure to said liquid to produce a pressure thereon greater than atmospheric while preventing contact of the air with said liquid to insure proper filling of the assembly.

4. A method of charging a thermostatic assembly of the liquid expansion type comprising the steps of evacuating said assembly, utilizing the vacuum thus created for causing a supply of thermo-responsive expansible liquid subjected to atmospheric pressure to flow into said assembly, then as a separate step after said assembly has been filled at atmospheric pressure applying air pressure to said liquid to produce a pressure thereon greater than atmospheric while preventing contact of the air with said liquid to insure complete filling of the assembly, and limiting the volume of said assembly to a predetermined amount during the charging operation.

5. A method of charging a thermostatic assembly of the liquid expansion type including an expansible bellows comprising the steps of evacuating said assembly, utilizing the vacuum thus created for causing a supply of thermo-responsive expansible liquid subjected to atmospheric pressure to flow into said assembly, and then as a separate step after said assembly has been filled at atmospheric pressure applying air pressure to said liquid to produce a pressure thereon greater than atmospheric while preventing contact of the air with said liquid to insure complete filling of the assembly, the expansible bellows of said assembly being so supported during the charging operation as to prevent its expansion beyond a predetermined volume.

6. A method of charging a thermostatic assembly of the liquid expansion type comprising the steps of connecting the assembly to a charging manifold, applying a source of vacuum to said manifold until said assembly is evacuated, then connecting said manifold to a supply of thermo-responsive expansible liquid subjected to atmospheric pressure and flowing a quantity thereof into said manifold and assembly, and then as a separate step after said assembly has been filled at atmospheric pressure applying air pressure to the liquid in said manifold to produce a pressure thereon greater than atmospheric while preventing contact of the air with the said liquid until an additional amount of liquid has been forced into said assembly sufficient to completely fill the latter.

7. A method of charging a thermostatic assembly comprising the steps of connecting the assembly to a charging manifold, applying a source of vacuum to said manifold until said assembly is evacuated, then connecting said manifold to a supply of thermo-responsive liquid and forcing said liquid into said manifold and assembly under sufficient pressure to charge the latter, closing communication between said assembly and manifold, and drawing the liquid remaining in said manifold when said assembly is disconnected therefrom out of the manifold and into a reservoir by applying said source of vacuum to said manifold through said reservoir.

8. A method of charging a thermostatic assembly of the liquid expansion type comprising the steps of connecting the assembly to a charging manifold, successively applying sources of low and high vacuum to said manifold until said assembly is evacuated, then connecting said manifold to a supply of thermo-responsive expansible liquid subjected to atmospheric pressure and flowing a quantity thereof into said manifold and assembly, then subjecting the liquid in said manifold to a pressure greater than atmospheric until an additional amount of liquid has been forced into said assembly sufficient to completely fill the latter, closing communication between said assembly and manifold, and drawing the liquid remaining in said manifold when said assembly is disconnected therefrom out of the manifold and into a reservoir by applying said source of low vacuum to said manifold through said reservoir.

9. A method of simultaneously charging a plurality of thermostatic assemblies of the liquid expansion type each having an open end and including an expansible bellows member comprising the steps of bringing the open ends of said assemblies into sealed communication with a manifold, so supporting the expansible bellows members of said assemblies as to limit the expansion thereof to a uniform predetermined extent, applying a source of vacuum to said manifold until all of said assemblies are evacuated, then connecting said manifold to a supply of thermo-responsive expansible liquid and forcing said liquid into said manifold and assemblies under sufficient pressure to completely fill all of the latter, crimping the open ends of said assemblies to prevent further communication with said manifold, and then disconnecting the assemblies from the manifold while subjecting the latter to a source of vacuum to prevent loss of the liquid remaining therein.

10. In apparatus for charging a thermostatic assembly, the combination of a filling pipe, means for placing the interior of said assembly in sealed communication with said pipe, means for supplying a quantity of charging liquid to said pipe whence it flows into said assembly, a reservoir, means for connecting said reservoir to said pipe, and means for creating a sufficient vacuum in said reservoir to draw into the reservoir whatever liquid remains in said pipe when said assembly is disconnected therefrom after the charging operation.

11. In apparatus for charging a thermostatic assembly of the liquid expansion type, the combination of a manifold, means for placing the interior of said assembly in sealed communication with said manifold, a source of vacuum, a container for holding a supply of thermo-responsive expansible liquid, means for successively connecting said source and said supply to said manifold, means for placing the liquid thus supplied to said manifold under sufficient pressure to completely fill the assembly therewith, and means for returning the liquid remaining in said manifold to the supply after the charging operation.

12. In apparatus for charging a thermostatic assembly of the liquid containing type, the combination of a manifold, means for placing the interior of said assembly in sealed communication with said manifold, a source of vacuum, a container for holding a supply of thermo-responsive liquid, means for successively connecting said source of vacuum and said supply to said manifold, means for placing the liquid thus supplied to said manifold under sufficient pressure to charge the assembly therewith, and means including said source of vacuum for returning to said supply the liquid remaining in said manifold after the charging operation.

13. In apparatus for charging a thermostatic assembly of the liquid containing type, the combination of a manifold, means for placing the interior of said assembly in sealed communication with said manifold, a vacuum pump, a main supply tank containing a quantity of thermo-responsive liquid, conduits connecting said pump and tank with said manifold, valves in said conduits for controlling the connection of said pump and tank to said manifold, a source of pressure greater than atmospheric, means for transmitting the pressure of said source to the liquid in the conduit connecting said tank and manifold and thereby forcing said liquid into said assembly, and an auxiliary tank interposed in the conduit connecting said pump and manifold for receiving any liquid which may be withdrawn from the latter by the suction of the former.

14. In apparatus for charging a thermostatic assembly, the combination of a filling pipe, means for placing the interior of said assembly in sealed communication with said pipe, a main supply tank containing a quantity of charging liquid, a conduit connecting said tank with said pipe, a source of pressure greater than atmospheric, means for transmitting the pressure of said source to the liquid in the conduit connecting said tank and pipe and thereby forcing said liquid into said assembly, an auxiliary tank, means for withdrawing into said auxiliary tank whatever amount of charging liquid remains in said pipe when the assembly is disconnected therefrom after the charging operation, and means for returning the liquid in said auxiliary tank to said main tank.

15. In apparatus for charging a thermostatic assembly, the combination of a filling pipe, means for placing the interior of said assembly in sealed communication with said pipe, a main supply tank containing a quantity of charging liquid, a conduit connecting said tank with said pipe, an auxiliary tank, means for withdrawing into said auxiliary tank whatever amount of charging liquid remains in said pipe when the assembly is disconnected therefrom after the charging operation, a conduit connecting said main and auxiliary tanks, a source of vacuum, and means for subjecting the contents of said auxiliary and main tanks to atmospheric pressure and said source of vacuum, respectively, wherein the liquid in said auxiliary tank may be returned to said main tank.

16. In apparatus for charging a thermostatic assembly of the liquid containing type, the combination of a manifold, means for placing the interior of said assembly in sealed communication with said manifold, a vacuum pump, a main supply tank containing a quantity of thermo-responsive liquid, conduits connecting said pump and tank with said manifold, valves in said conduits for controlling the connection of said pump and tank to said manifold, a source of pressure greater than atmospheric, means for transmitting the pressure of said source to the liquid in the conduit connecting said tank and manifold and thereby forcing said liquid into said assembly, an auxiliary tank, means for withdrawing into said auxiliary tank whatever amount of liquid remains in said manifold when the assembly is disconnected therefrom after the charging operation, a conduit connecting said main and auxiliary tanks, a valve in said last named conduit, and means for subjecting the contents of said auxiliary and main tanks to atmospheric pressure and the suction of said vacuum pump, respectively, whereby the liquid in said auxiliary tank may be returned to said main tank.

17. In apparatus for charging thermostatic assemblies of the liquid containing type from a manifold to which a charging liquid is supplied, a connector for placing the open end of one of said assemblies in sealed communication with said manifold comprising an externally threaded body portion having an unthreaded extension of reduced diameter and a passage therethrough communicating with the interior of the manifold, a hollow clamping nut having threaded engagement with said body portion, a cup-shaped guiding member mounted within said clamping nut and having telescoping engagement with said extension, and a sealing gland of relatively soft, compressible material mounted within said guiding member and interposed between the bottom thereof and the end of said extension, said clamping nut, guiding member and sealing gland having axially aligned openings therethrough to receive the open end of the thermostatic assembly.

PAUL E. CATE.